United States Patent [19]
Furman et al.

[11] Patent Number: 6,031,905
[45] Date of Patent: Feb. 29, 2000

[54] NETWORK-BASED CALL HOLD STAND BY

[75] Inventors: Daniel Selig Furman, Summit; Christopher P. Gilboy, Freehold, both of N.J.

[73] Assignee: AT&T Corp, New York, N.Y.

[21] Appl. No.: 08/932,554

[22] Filed: Sep. 17, 1997

[51] Int. Cl.[7] .................................................. H04M 3/64
[52] U.S. Cl. .......................................... 379/201; 379/393
[58] Field of Search ........................ 379/67.1, 80, 88.01, 379/88.12, 88.18, 88.2, 127, 142, 157, 162, 164, 201, 207, 209, 215, 217, 243, 257, 266, 372, 373, 377, 387, 393

[56] References Cited

U.S. PATENT DOCUMENTS

| | | | |
|---|---|---|---|
| 2,506,279 | 5/1950 | Rowe | 379/393 |
| 3,961,142 | 6/1976 | Caffine | 179/81 |
| 4,425,479 | 1/1984 | Dubner et al. | 179/81 B |
| 4,731,822 | 3/1988 | Berry, III et al. | 379/163 X |
| 4,834,551 | 5/1989 | Katz | 379/68 |
| 5,003,587 | 3/1991 | Forbes | 379/393 |
| 5,436,967 | 7/1995 | Hanson | 379/266 |
| 5,572,587 | 11/1996 | Gaglani | 379/393 |
| 5,668,861 | 9/1997 | Watts | 379/201 |
| 5,712,902 | 1/1998 | Florence et al. | 379/376 |
| 5,764,746 | 6/1998 | Reichelt | 379/207 |

FOREIGN PATENT DOCUMENTS

| | | |
|---|---|---|
| 3808414 | 10/1989 | Germany. |
| 2-238760 | 9/1990 | Japan. |
| 2-285760 | 11/1990 | Japan. |

*Primary Examiner*—Scott Weaver

[57] ABSTRACT

A telecommunications network-based method for alerting a calling party, placed on hold by the called party, that a called party is ready to communicate comprising the steps of receiving an activation signal for activating the network-based system; monitoring the called party's telephone line for availability, where "availability" refers to the situation when the called party removes the hold condition or when the called party is ready to communicate with the calling party, and informing the called party that the Call Hold Stand-by service is alerting the calling party that the called party is available. The network-based method can operate as calling party feature, independent of the called party, or as a feature that is provided by the called party to the calling party.

55 Claims, 3 Drawing Sheets

NETWORK-BASED CALL HOLD STAND BY

BACKGROUND OF THE INVENTION

1. Technical Field

This invention generally relates to telephone call hold systems and, more particularly, to a network-based telephone call hold system that enables a calling party to be notified when the called party is ready to communicate without tying up the calling party's telephone line or the network during the hold condition.

2. Description of the Related Art

When a caing party is placed on hold or waiting for service from a queue, the calling party must continue to listen to the speaker portion of the telephone handset until the called party has removed the hold condition. Absent a speaker phone feature, the calling party must aurally monitor the hold condition by keeping the telephone receiver at the calling party's ear to ensure that the calling party is ready to communicate when the called party becomes available. For example, consider a calling party who calls an airline to make flight reservations. The calling party may remain on hold for a considerable length of time before a live operator becomes available. Unless the calling party has a speaker phone, the calling party must endure through a long waiting period with the telephone receiver at the calling party's ear so that the calling party is ready when the called party service provider becomes available. Moreover, even with the presence of a speaker phone, the calling party is held hostage by the hold condition because the calling party's telephone line remains tied up, thereby precluding the calling party from entertain phone calls from other parties.

Enduring through a hold condition for a prolonged period of time wastes the calling party's time and causes the calling party to become agitated with the called party. As a result, a hostile environment develops when the called party is finally ready to communicate with the calling party. Consequently, it is an overall objective of present invention to provide a more convenient method for notifying the calling party when the called party becomes available to communicate. The prior art provides known yet inadequate solutions.

U.S. Pat. No. 3,961,142 issued to Caffine teaches the automatic and electronic monitoring of the telephone line during a hold condition in order to detect the presence of a voice signal. Upon detection of a voice signal, an annunciation signal is generated in order to inform the calling party that the called party is ready to communicate. Caffine discloses the use of an electronic voice detection circuit embedded in a line card of the customer premise equipment that operates as a substitute for aural monitoring by the calling party. In this respect, the patent contemplates the use of a circuit that seeks to detect a signal on the telephone line that would indicate the end of the hold interval (i.e. the called party has returned to the phone and spoken into the mouthpiece). Caffine, however, requires the calling party to install a line card with additional voice detection circuitry in place of the standard line card. Consequently, Caffine requires customer premise equipment that keeps the calling party's telephone line and network tied up and precludes the calling party from receiving phone calls from other parties during the call hold period.

U.S. Pat. No. 4,425,479 issued to Dubner et al. relates to an apparatus comprising an electronic circuit including voice detection circuitry for detecting the presence of a voice signal from the called party. The output of the voice detection circuit is connected to a timer. The output of the timer is connected to an annunciator circuit that produces an annunciation signal for a period of time determined by the timer. The output of the annunciation signal circuitry is also transmitted back to the called party. That transmission attempts to prevent the possibility that the called party will mistakenly believe that the line has gone dead or that the calling party has prematurely terminated the call, thereby urging the called party to remain on line until the calling party has an opportunity to come back to the line. Similar to Caffine, the Dubner et al. require that the calling party physically incorporate an apparatus into a telephone system on the calling party's premises. Thus, like Caffine, Dubner et al. require the use of customer premise equipment that keeps the calling party's telephone line and network tied up and prevents the calling party from receiving other calls during the call hold period.

U.S. Pat. No. 4,834,551 issued to Katz teaches a system that comprises an appartus for signaling to the calling party that the called party is ready to converse. As soon as the calling party is placed on hold, Katz allows the calling party to press an activate bottom that generates a pre-recorded message to be transmitted back to the called party. The pre-recorded message informs the called party that in order to reestablish communication with the calling party it will be necessary for the called party to enter a certain predetermined dual tone multi frequency (DTMF) signal. The DTMF signal actvates a tone detector that turns off the message generator and produces audio and visual signals to alert the calling party. The calling party then deactivates the system by pressing the deactivate contact botton and picks up the receiver to resume communication. Katz implements a device that allows the customer to activate/deactivate the system. Also, it appears that the activate/deactivate device is implemented on the calling party's premises. Consequently, like the Caffine and Dubner et al. patents, Katz uses customer premise equipment that ties up the calling party's telephone line during the hold condition. Furthermore, the Katz patent allows the called party the option to re-establish contact with the calling party. Under that system, if the called party chooses not to enter the predetermined DTMF dialtone, then the calling party will not have an opportunity to communicate with the called party and the time spent waiting on hold and tying up the telephone line and network will be wasted.

SUMMARY OF THE INVENTION

The present invention provides for a network-based Call Hold Stand-by service that allows a calling party, placed on hold by the called party, the freedom to go on-hook without terminating the calling party's network connection to the called party. Specifically, the present invention allows the calling party to be alerted when the called party is available to communicate without requiring the calling party to aurally monitor the calling party device.

A distinguishable feature of the present invention over the prior art is that the present invention is implemented through a telecommunication network and does not require any customer premise equipment. As a result, an advantage of the present invention is that it permits the calling party who is on hold to receive phone calls from other parties. During the hold status, the present invention puts the calling party's connection to the called party in a stand-by mode and does not tie up the calling party's telephone line or the network.

A telecommunications network-based method for alerting the calling party, placed on hold by the called party, that the called party is ready to communicate with the calling party in accordance with the teachings of present invention comprises the steps of receiving an activation signal for activating the network-based system; monitoring the called party's telephone line for availability, where "availility" refers to the situation when the called party removes the hold status or when the called party is ready to communicate with the calling party; and informing the called party that the Call Hold Stand-by service is alerting the calling party that the called party is available. In one embodiment, the calling party may be alerted by ringing the calling party's telephone.

These and other, features of the present invention will become clear from reading the detailed description of the drawings that follow.

DETAILED DESCRIPTION

Two possible embodiments of the present invention are the Call Hold Stand-by service as a calling party feature, independent of the called party, and the Call Hold Stand-by service as a feature that is provided by the called party to the calling party.

Figure 1:
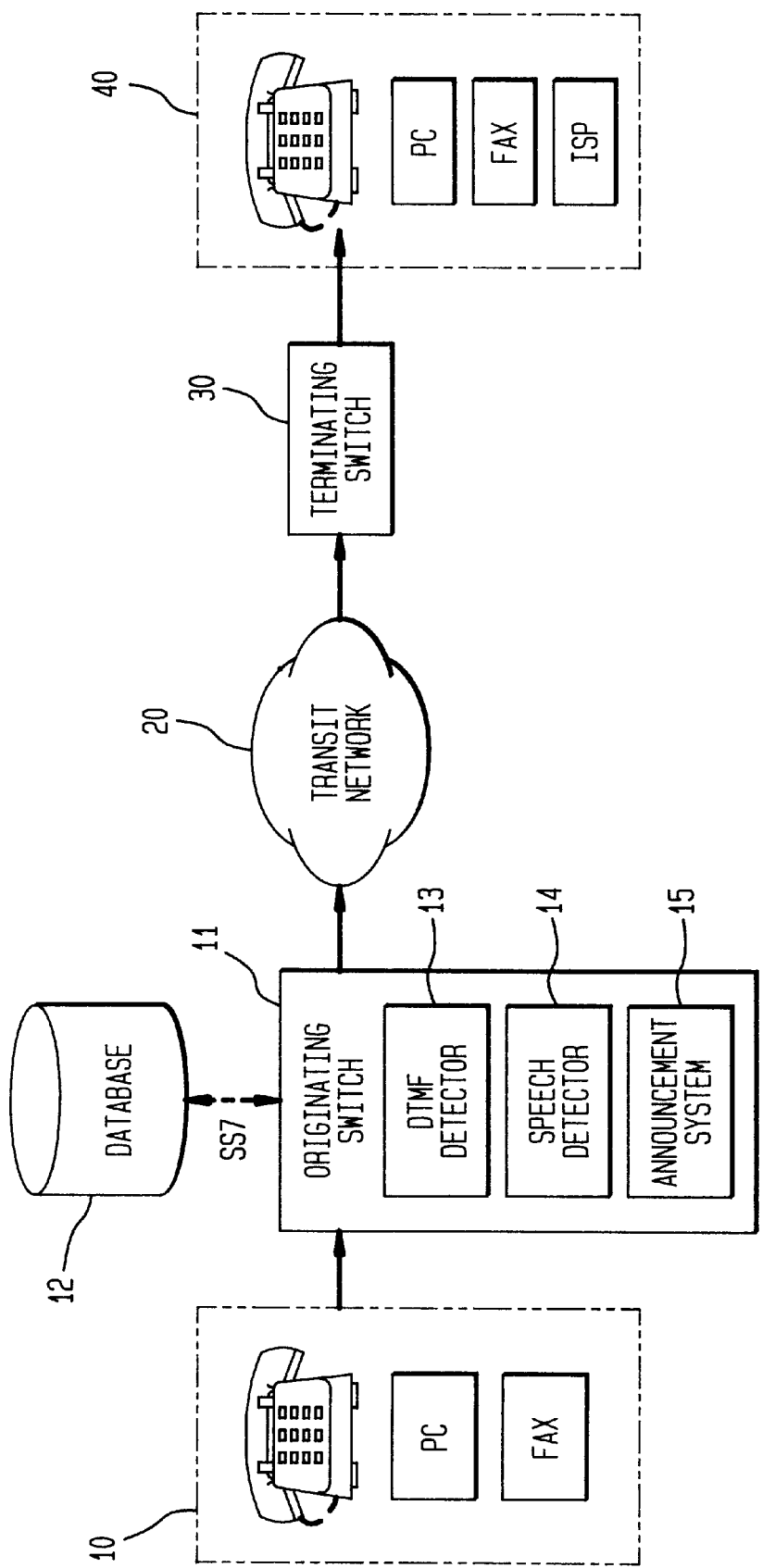
FIG. 1 illustrates the a schematic drawing of a typical telephone network used to implement the network-based service of the present invention.

Referring to FIG. 1, there is shown a telephony network used to implement the present invention. The calling party, the party originating the phone call that can also be referred to as the "originating party", uses device 10 to initiate a phone call. Device 10 may be a telephone set, computer, facsimile machine, or other device. Originating switch 11 forwards the calling party's number and the number of the called party to database 12. The originating switch 11 may be a local switch such as 5ESS switch (available from Lucent Technologies, Inc.), a toll switch such as a 4ESS switch (available from Lucent Technologies, Inc.), a private branch exchange (PBX), or other local switching device such as tandem switch or a toll switch. Database 12 may be an Advanced Intelligent Network (AIN), a Service Control Point (SCP), a Network Control Point (NCP), a Line Information Database (LIDB), or any other similar device.

Upon receiving the csling party's telephone number and the called party's telephone number, the database 12 looks through a calling table in order to determine whether the calling party or the called party qualifies for the Call Hold Stand-by service. The call is then connected through the Transit Network 20 and the Terminating Switch 30 to the called party device 40. Like the calling party's device 10, the called party device 40 may be a telephone set, a computer, a facsimile machine, or any similar device. The DTMF detector 13, Speech Detector 14, and the Announcement System 15 are components within the originating switch 11. Those component however, could be physically implemented as attached peripherals or adjuncts to the originating switch 11. The DTMF detector 13 and the speech detector 14 are employed to determine the status of the telephone line. That is, the DTMF detector 13 and the speech detector 14 monitor the called party telephone line to determine if the called party has removed the hold condition and is ready to communicate with the calling party. The announcement system 15 is used to play the prerecorded announcements to either the calling party or the called party.

In the embodiment of the Call Hold Stand-by service as a calling party feature, the calling party presubscribes the calling party's phone number or automatic number identification (ANI) to the service. The presubscription can be done either by the calling party requesting the service or by the telephone service provider proactively enrolling the calling party's ANI without a request from the calling party. The calling party can presubscribe by contacting their telephone service provider, e.g., a local exchange carrier (LEC) or a toll carrier. Next, the LEC or the toll carrier forms a permanent record of the calling party's subscription in a subscriber database. Once presubscribed, the calling party is eligible to use the service on any call during which the calling party is placed on hold. When the calling party is placed on hold by the called party, the calling party may enter a service activation code (e.g., #789), receive an acknowledgment that the network-based service is activated, and then go on-hook (i.e., hang up the phone) while remaining in stand-by mode without breaking the telecommunications connection to the called party. The network continually monitors the telecommunication line for any voice activation or response from the called party and, upon detection, asks the called party to stand-by. Simultaneously, the network rings the calling party to notify the calling party that the called party is ready to communicate. Then, the calling party goes off-hook (i.e., picks up the phone to begin communication) and begins conversing with the called party.

In the embodiment of the Call Hold Stand-by service as a feature provided by the called party, the called party presubscribes to the service and, therefore, has the capability of providing the service to any calling party. Under that scenario, when the called party places a calling party on hold, an announcement is played to the calling party informing the calling party that the calling party may go on-hook and the called party will ring the calling party when the called party is available to commnicate. The called party also sends a signal to notify the network that the Call Hold Stand-by capability may be used on the call. The network monitors the calling party and looks for an on-hook condition. When the network detects an on-hook condition, the teleconmunication connection between the calling party and the called party remains in tact. The network then monitors the called party for any signal indicating that the called party is ready to re-establish the fully communications path with the calling party. When the network receives indication that the called party is ready to communicate (e.g., using in-band DTMF signaling or voice detection), the network rings the calling party's phone in order to alert the calling party that the called party is ready to communicate. Finally, the calling party goes off-hook and begins communicating with the called party.

Figure 2A:
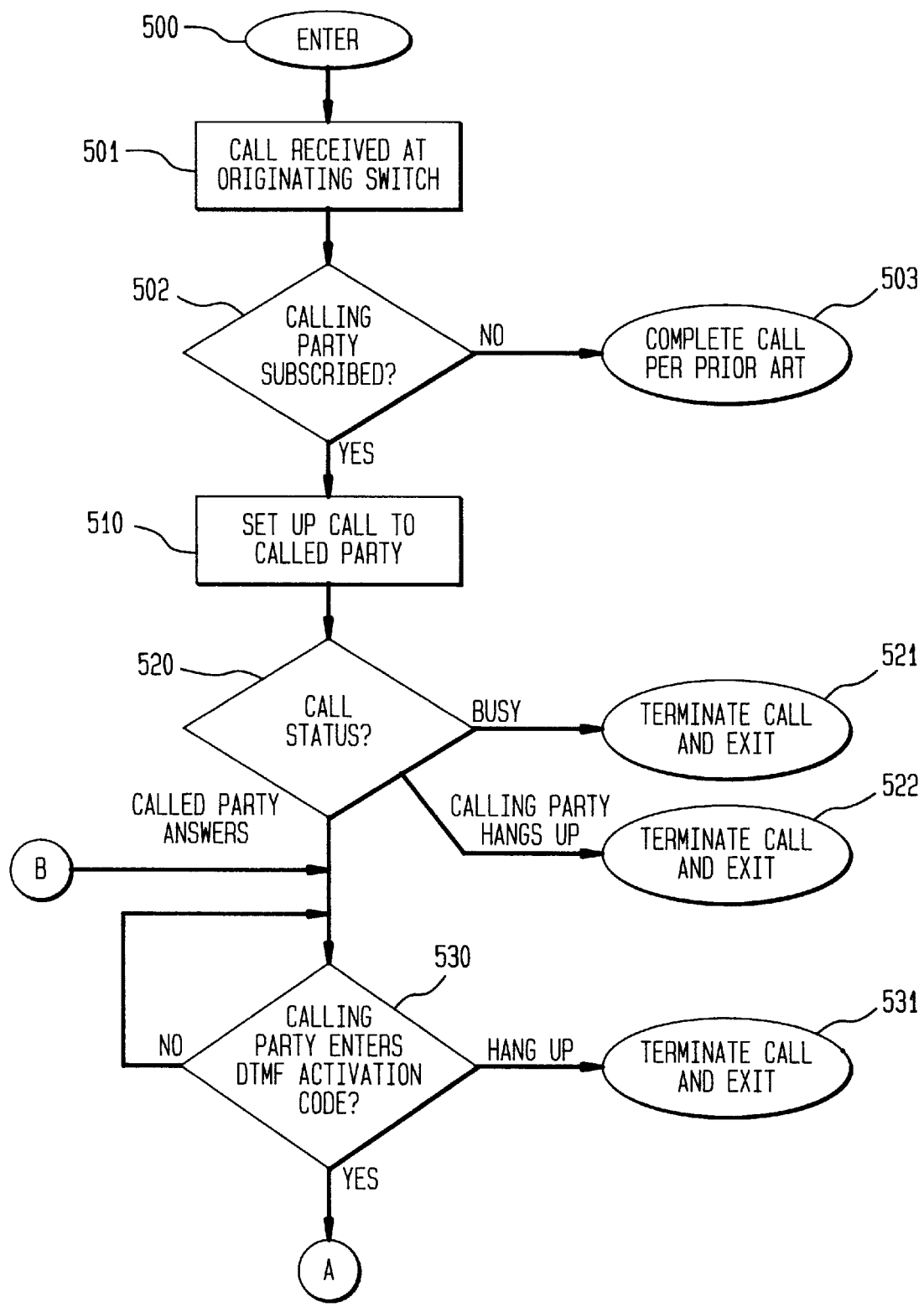
FIG. 2 illustrates a flow diagram of the events that occur in the network-based service of the present invention.
Figure 2B:
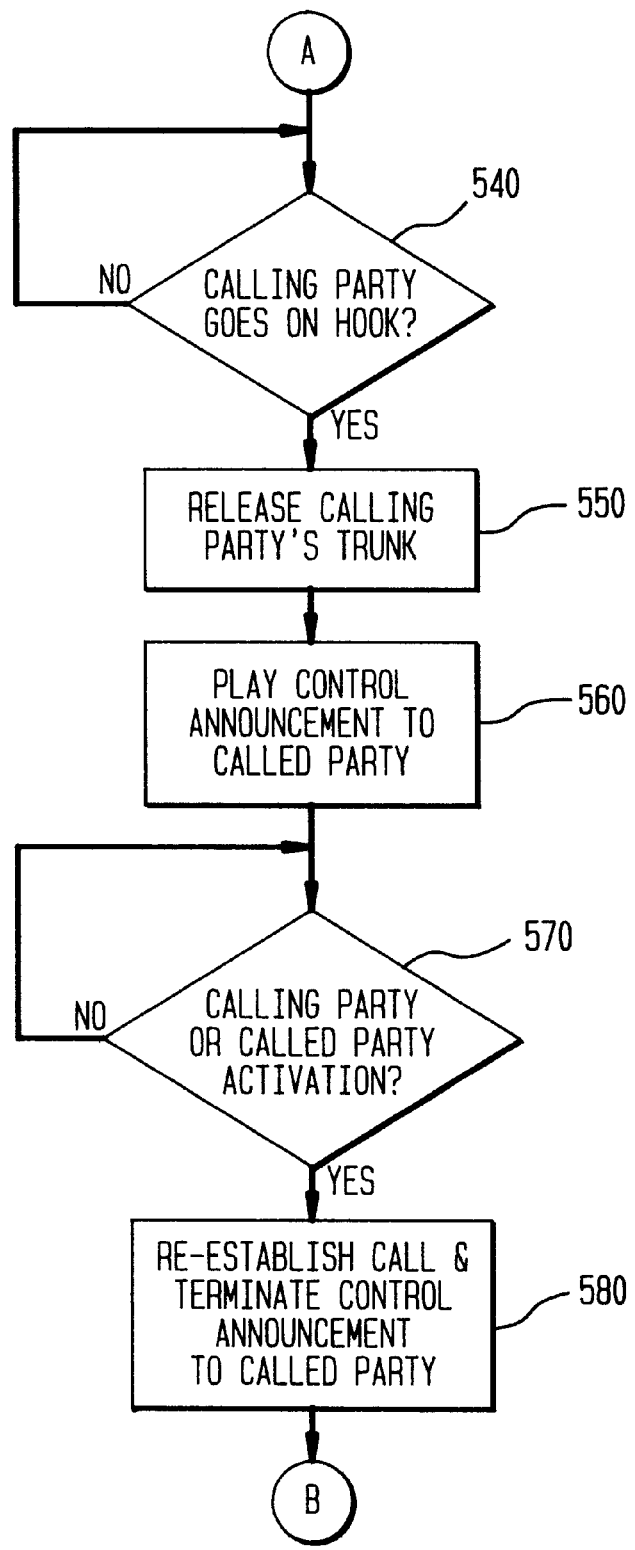

Referring to FIG. 2, there is shown a flow diagram of the sequence of events that occur in the present invention. At step 500, the entry point, the calling party makes a call to the called party. At step 501, the originating switch 11 receives the incoming call initiated by the calling party.

At step 502, the originating switch 11 queries the database 12 to determine if the calling party or the called party is eligible for the Call Hold Stand-By service. Originating switch 11 sends the calling party's Automatic Number Identification (ANI) and the called party's telephone number (i.e., the call terminating number or the Dialed Number (DN)) to database 12. Next, database 12 looks through the subscription data to determine if either the ANI or the DN qualifies for the service provided by this invention. If no match is found, database 12 returns a "No Match" indicator to originating switch 11 and, at step 503, the call processing continues per prior art. If, however, the database 12 finds a match the call proceeds to step 510.

At step 510, the calling party connects to the desired called party. The call is set up through the origin switch 11, the Transit Network 20, and the terminating switch 30 to the called party device 40. At step 520, the call status is determined. If the called party's telephone line is busy, then a busy signal plays back to the calling party and when the calling party goes on-hook the call terminates and the calling party exists the network at step 521. If the called party's telephone line continues to ring, but the called party fails to answer, then, at some point, the calling party will decide to terminate the call and go on-hook. When the calling party goes on-hook, the call terminates and the calling party exists the network at step 522. If the called party answers, the call proceeds to step 530, where the network begins monitoring for DTMF signals that may correspond to the activation code.

At step 530, a detection device monitors for a service activation signal. For example, the DTMF detector 14 within the originating switch 11 may begin to monitor continuously for DTMF signals and, more specifically, for the service activation code, which would be a predefined code consisting of any DTMF digit sequence of any length (i.e., "#321" or "*22"). At step 530, it should be noted that the calling party may or may not have knowledge of the present invention, the inventions's use, and the invention's method of activation. If the calling party qualifies for the Call Hold Stand-by service via the calling party's ANI and was aware of the invention's use, then the calling party would most likely have knowledge of the invention and would know the activation code. If the calling party qualified for this service via the called party's DN, then the calling party may have a very limited knowledge about the service. Under this scenario, when the called party places the calling party on hold, the network plays some type of pre-recorded message that informs the calling party that the calling party can enter a certain activation code and place their phone on-hook and that the calling party's phone will ring when the called party is ready to communicate. At step 530, either of two primary events may occurs. First, either the calling party or the called party could go on-hook When that occurs, the call terminates at step 531. Second, the calling party could enter a DTMF activation code. When this occurs, the DTMF detector 14 will collect the sequence of digits entered by the calling party and check to see if the entered digits correspond to the proper activation code.

Assuming the correct activation code was entered, the call proceeds to step 540. At step 540, the originating switch 11 waits for the calling party to go on-hook. At step 550, after the calling party goes on-hook, the originating switch 11 releases the canning party's trunk or the circuit between the originating switch 11 and the calling party device 10. At step 560, originating switch 11 uses the announcement system 15 to play a pre-recorded message informing the called party that the calling party is on stand-by mode. The prerecorded message could also instruct the called party to enter a DTMF digit or digits to request that the calling party go off stand-by mode and return to the calling party's device 10.

At step 570, the network begins to continually monitor both the calling party and the called party. The calling party is monitored for an off-hook signal at the calling party device 10. When the calling party goes off-hook, the network assumes that the calling party is ready to re-establish the connection between the calling party and the called party. This allows the calling party to rejoin the on-hold state set by the called party. The called party is monitored by using a DTMF detector 13 and/or a speech detector 14. That is, the DTMF detector 13 monitors for the called party to enter a DTMF digit or digits as instructed by the announcement system 15. The speech detector 14 could also be used to look for far-end speech coming form the called party. It is assumed, however, that to the DTMF detector would be more reliable since many called party service providers play music while the calling party is on hold and it can sometimes be difficult to distinguish far-end speech from the music. When the called party either enters the appropriate DTMF digit or digits or generates speech recognizable by the speech detector 14, the network assumes that the called party is ready to re-establish the communication with the calling party.

At step 580, the originating switch 11 re-establishes the trunk with the calling party device 10 in order to restore the original circuit created during the call set up (step 510). The originating switch 11 also instructs the announcement system 15 to terminate the recording that it was playing to the called party. If the called party called requested activation at step 570, the network rings the calling party device 10 to notify the calling party that the called party is ready to communicate. When the calling party goes off-hook the full connection to the called party is reestablished.

The foregoing is merely illustrative of the principles of the invention and various modifications can be made and come to mind to those of ordinary skill in the art from studying the present specification and without departing from the scope and spirit of the invention. For example, different informative messages may be provided by the announcement system 15. Different hardware may be used man shown and suggested that may comprise hardware, firmware, or software implementation of the present invention. Any United States patents or patent applications cited herein should be deemed to be incorporated by reference as to their contents. The invention should only be deemed limited in scope by the claims that follow.

We claim:

1. A telecommunications network-based method implemented as a telecommunications network-based service, said method for notifying a calling party, placed on hold by a called party, that said called party is ready to communicate with said calling party, comprising the steps of:

receiving an activation signal for activating said telecommunications network-based service;

checking a subscriber database to determine if said calling party qualifies for said network-based service;

monitoring said called party's telephone line for availability; and informing said called party that said network-based service is alerting said calling party that said called party is available.

2. The method of claim 1, wherein said receiving step further comprises the step of monitoring for a predetermined activation code.

3. The method of claim 2, wherein said receiving step further comprises the step of receiving said activation code.

4. The method of claim 3, wherein said activation code is in the form of a DTMF digit sequence.

5. The method of claim 3, wherein said activation code is in the form of voice signals.

6. The method of claim 1, wherein said subscriber database uses said calling party's ANI to determine whether said calling party qualifies for said network-based service.

7. The method of claim 1, wherein said subscriber database uses said called party's DN to determine whether said calling party qualifies for said network-based service.

8. The method of claim 1, wherein the receiving step further comprising the step of playing a prerecorded message for said calling party.

9. The method of claim 8, wherein said prerecorded message instructs said calling party to enter an activation code.

10. The method of claim 9, wherein said prerecorded message further instructs said calling party to go on-look and that said calling party will be alerted when said called party becomes available to communicate.

11. The method of claim 1, wherein said receiving step further comprises the step of waiting for said calling party to go on-hook.

12. The method of claim 11, wherein said receiving step further comprises the step of releasing a circuit between an originating switch and a calling party device.

13. The method of claim 1, wherein said receiving step further comprises the step of playing a pre-recorded message to the called party.

14. The method of claim 13, wherein said prerecorded message informs said called party that said calling party is on stand-by mode.

15. The method of claim 14, wherein said prerecorded message informs said called party to enter an activation code in order to request that said calling party go off stand-by mode and return to a calling party device.

16. The method of claim 1, wherein said monitoring step uses a DTMF detector to monitor for the availability of said called party's telephone line.

17. The method of claim 1, wherein said monitoring step uses a speech detector to monitor for the availability of said called party's telephone line.

18. The method of claim 1, wherein said monitoring step further comprises the step of monitoring said calling party for an off-hook condition.

19. The method of claim 1, wherein said monitoring step further comprises the step of maintaining a telephone connection between said calling party and said called party in stand-by mode.

20. The method of claim 1, wherein said informing step further comprises the step of playing a prerecorded message for said called party.

21. The method of claim 20, wherein said prerecorded message informs said called party that said calling party is on stand-by and that said network-based service is alerting said calling party that said called party is available to communicate.

22. The method of claim 1, wherein said informing step further comprises, the step of ringing a calling party's device in order to alert said calling party that said called party is available.

23. The method of claim 1, wherein said informing step further comprises the step of restoring an original circuit between an originating switch and a calling party's device that was created during the call set up.

24. An apparatus for notifying a calling party, placed on hold by a called party, that said called party is ready to communicate with said calling party, comprising:
  means for receiving an activation signal for activating a network-based service;
  means for checking a subscriber database to determine if said calling party qualifies for said network-based service;
  means for monitoring said called party's telephone line for availability; and
  means for informing said called party that said network-based service is alerting said calling party that said called party is available.

25. The apparatus of claim 24, wherein said receiving means further comprises means for monitoring for a predetermined activation code.

26. The apparatus of claim 25, wherein said receiving means further comprises means for receiving said activation code.

27. The apparatus of claim 26, wherein said activation code is in the form of a DTMF digit sequence.

28. The apparatus of claim 26, wherein said activation code is in the form of voice signals.

29. The apparatus of claim 24, wherein said subscriber database uses said calling party's ANI to determine whether said calling party qualifies for said network-based service.

30. The appartaus of claim 24, wherein said subscriber database uses said called party's DN to determine whether said calling party qualifies for said network-based service.

31. The apparatus of claim 24, wherein said receiving means further comprises means for playing a prerecorded message for said calling party.

32. The apparatus of claim 31, wherein said prerecorded messages instructs said calling party to enter an activation code.

33. The apparatus of claim 31, wherein said prerecorded message further instructs said calling party to go on-hook and that said calling party will be notified when said called party becomes available to communicate.

34. The apparatus of claim 24, wherein said receiving means further comprises means for waiting for said calling party to go on-hook.

35. The apparatus of claim 34, wherein said receiving means further comprises means for releasing a circuit between an originating switch and a calling party device.

36. The apparatus of claim 24, wherein said receiving means further comprises means for playing a prerecorded message to said called party.

37. The appartus of claim 36, wherein said prerecorded message informs said called party that said calling party is on stand-by mode.

38. The apparatus of claim 37, wherein said prerecorded message further informs said called party to enter an activation code in order to request that said calling party go off stand-by mode and return to the a calling party device.

39. The apparatus of claim 24, wherein said monitoring means uses a DTMF detector to monitor for the availability of said called party's telephone line.

40. The apparatus of claim 24, wherein said monitoring means uses a speech detector to monitor for the availability of said called party's telephone line.

41. The apparatus of claim 24, wherein said monitoring means further comprises means for monitoring said calling party for an off-hook condition.

42. The apparatus of claim 24, wherein said monitoring means further comprises means for playing a prerecorded message for said called party.

43. The apparatus of claim 42, wherein said prerecorded message informs said called party that said calling party is on stand-by mode and that said network-based service is alerting said calling party that said called party is available to communicate.

44. The apparatus of claim 24, wherein said informing means further comprises means for ringing a calling party's device in order to alert said calling party that said called party is available.

45. The appartus of claim 24, wherein said informing means further comprises means for restoring an original circuit between an originating switch and a calling party device that was created during the call set up.

46. The apparatus of claim 24, wherein said monitoring means further comprises means for maintaining a telephone line connection between said calling party and said called party in stand-by mode.

47. A network-based system for notifying the calling party, placed on hold by the called party, that said called party is ready to communicate with said calling party, comprising:
- an originating switch for receiving the ANI, DN, and activation code;
- a processor for consulting a subscriber database to determining whether said calling party qualifies for a network-based service associated with call hold stand-by; and
- a terminating switch for completing the telephone call to said called party, said originating switch for further monitoring said called party's telephone line for availability and for alerting said calling party when said called party is available.

48. The system of claim 47, wherein the originating switch contains an announcement system, speech detector, and DTMF detector attached to said originating switch.

49. The system of claim 48, wherein said announcement system, speech detector, and DTMF detector are attached as adjuncts to said originating switch.

50. The system of claim 48, wherein said announcement system, speech detector, and DTMF detector are attached as peripherals to said originating switch.

51. The system of claim 47, further comprising a calling party device.

52. The system of claim 51, wherein said calling party device is one of a telephone, a computer, or a facsimile machine.

53. The system of claim 47, further comprising a called party device.

54. The system of claim 53, wherein said called party device is a telephone, a computer, or a facsimile machine.

55. The system of claim 47, wherein the subscriber database further comprises a record table of ANIs, DNs, and the subscription status of the ANI and DN to said network-based service.

* * * * *